Nov. 1, 1966  R. H. ROGERS  3,283,144

PORTABLE LIGHT

Filed May 15, 1964

INVENTOR.
RICHARD H. ROGERS
BY~ Maybee & Legris
ATTORNEYS

United States Patent Office 3,283,144
Patented Nov. 1, 1966

3,283,144
PORTABLE LIGHT
Richard H. Rogers, Scarborough, Ontario, Canada, assignor to Consolidated Electronic Equipment Company Limited, Toronto, Ontario, Canada, a corporation of Ontario
Filed May 15, 1964, Ser. No. 367,734
2 Claims. (Cl. 240—51.11)

This invention relates to portable lighting units, and in particular to fluorescent units that can be operated from a battery. Such units are useful for camping, for use around automobiles, and for the provision of emergency lighting.

The lighting unit includes an inverter circuit for converting a low D.C. voltage to a relatively high A.C. voltage to energize the fluorescent lamp. The inverter circuit includes one or more transistors, and a problem is created by the heat generated by such transistors and by the transformer and possibly other components of the inverter circuit. Excessive heat can result in transistor failure and a greatly reduced life expectancy of the lighting unit.

According to the present invention, the foregoing difficulties can be reduced by providing a portable lighting unit of the type hereinbefore described comprising a fluorescent lamp, an inverter circuit including at least one transistor, and a metal reflector on which the transistor is mounted in intimate contact. In this arrangement the metal reflector acts both as a reflector of light and as a heat sink for the transistor. Sufficient heat is dissipated from the transistor by means of the reflector to protect the transistor and prolong the life of the lighting unit.

The invention will now be described by way of example with reference to the accompanying drawings in which.

Figure 1:
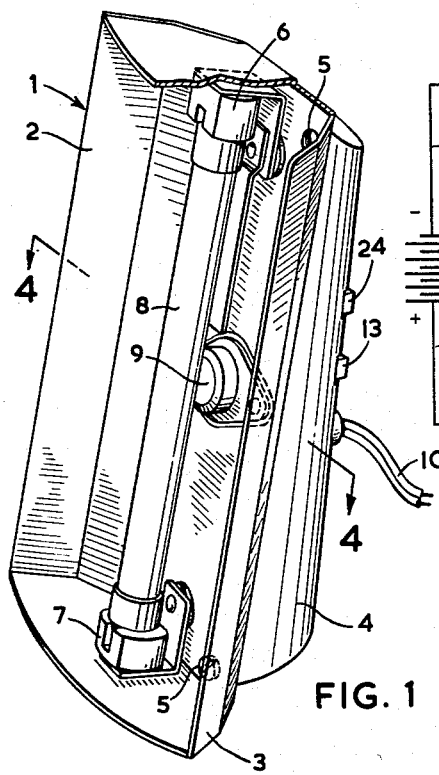
FIGURE 1 is a front perspective view of a portable lighting unit embodying the invention.
Figure 4:
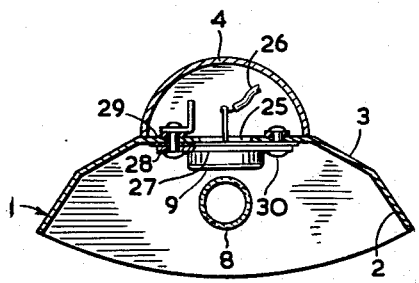
FIGURE 4 is a sectional view taken along line 4—4 in FIGURE 1, showing the arrangement whereby a transistor is mounted on a metal reflector.

Referring to FIGURE 1, the portable lighting unit consists of a metal reflector 1, having a front surface 2 and a rear surface 3 and a cover 4 secured against the rear surface 3 of the metal reflector by screws 5. Mounted on the front surface 2 of the metal reflector is a pair of fluorescent lamp sockets 6 and 7 arranged to removably receive a fluorescent lamp 8. Also, as shown in FIGURES 1 and 4, a transistor 9 is mounted on the front surface 2 of the metal reflector, behind the lamp 8, where it is exposed to the ambient air.

The transistor 9 forms part of a conventional electrical inverter circuit. The remaining components of the inverter circuit are located in an enclosure formed by the cover 4 and the rear surface 3 of the metal reflector 1. A direct current source is connected to the inverter by means of a pair of electrical leads 10 that pass through an opening 11 in a wall of the enclosure.

Figure 3:
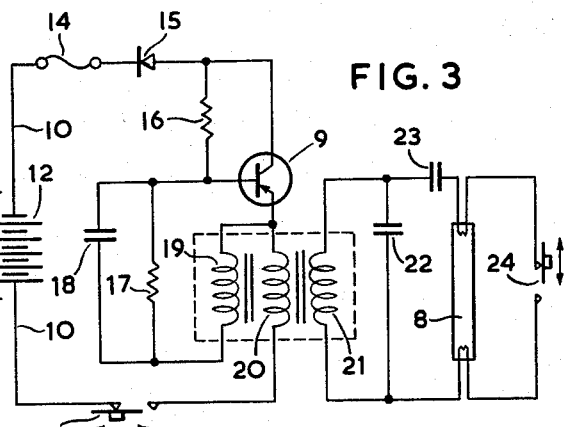
FIGURE 3 is a schematic electrical diagram for the portable lighting unit.
Figure 2:
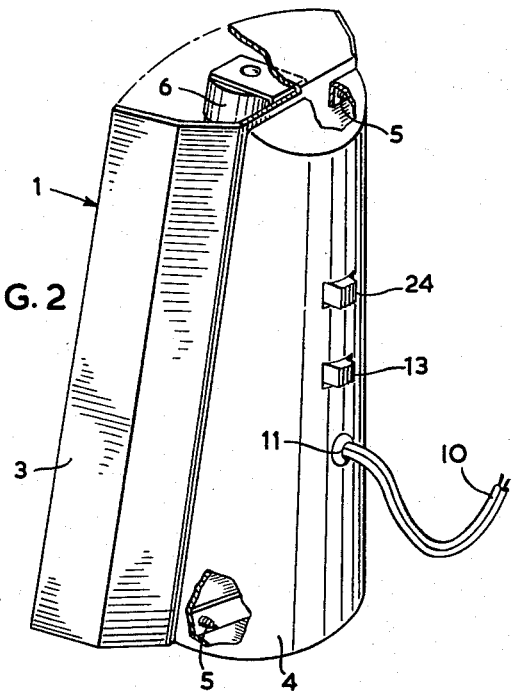
FIGURE 2 is a rear perspective view of the portable lighting unit.

FIGURE 3 shows schematically the electrical circuit arrangement. To operate the portable lighting unit a battery 12 such as a standard 6 volt or 12 volt automobile battery is connected to the pair of leads 10 which are in turn connected through a switch 13, a fuse 14 and a diode 15 to the inverter circuit. Both the fuse and the diode are safety elements; the fuse prevents overloading current surges, and the diode prevents operation if the battery is connected into the circuit with improper polarity. The inverter circuit (which is conventional) includes the transistor 9, a resistor 16, a resistor 17, an electrolytic condenser 18, and a transformer having a feedback winding 19, a primary winding 20 and a seconding winding 21.

When the switch 13 is closed, the battery 12 supplies direct current to the inverter circuit. The transistor 9, when actuated by this power supply, becomes cyclically a low impedance and high impedance electrical element, resulting in a pulsating direct current passing through the primary winding 20 of the transformer. This 6 volt or 12 volt pulsating current is stepped up in the transformer so that the secondary winding 21 has an output of sufficiently high voltage to operate the fluorescent lamp 8. A condenser 22 is connected across the secondary winding 21 to suppress high peak transient voltages and a condenser 23 is connected in series with the lamp 8 to act as a ballast to limit the current to a safe operating level after the lamp has started up. A switch 24 is connected across the lamp 8; this switch is spring loaded so it must be positively held in the closed position. To start the lamp, the switch 13 is closed and the switch 24 is also held closed for a sufficient time to enable electron emission to begin in the fluorescent lamp 8. Then the switch 24 can be released.

FIGURE 4 shows how the transistor 9 is located in intimate contact with the front surface 2 of the metal reflector 1. In the metal reflector 1 there is an aperture 25 over which the transistor 9 is positioned, thus enabling electrical connections to be made to the transistor by means of leads such as lead 26 at the rear of the reflector 1. The transistor has a base 27 in which there is a pair of holes 28 that are aligned with a like pair of holes 29 in the metal reflector. A pair of rivets 30 pass through the aligned holes to bring the base 27 of the transistor into intimate contact with the front surface 2 of the reflector 1. Neither the transistor nor the reflector is painted or coated prior to assembly, so that an intimate metal to metal contact is obtained to facilitate transfer of heat from the transistor to the reflector.

The transformer and the circuit components of the inverter are attached to the rear surface of the reflector, so that they can be exposed simply by removing the cover 4. Because the metal reflector 1 serves as a heat sink for the transistor 9, a thermally and electrically insulative material can be used for the cover 4. Thus the transformer can be of an inexpensive open end type, since it is not surrounded by a metal housing in which eddy currents are induced. The sides or wings of the reflector, extending beyond the cover 4, are exposed both at their rear and at their front surface to cooling by the ambient air.

What I claim as my invention is:

1. A portable lighting unit comprising an elongated fluorescent lamp, a metal reflector located behind the lamp and having a front surface facing the lamp for reflecting light from the lamp and a rear surface facing away from the lamp, a cover secured to the rear surface of the reflector to define an enclosure therewith, substantially the whole of the front surface of the reflector being uncovered and exposed to the ambient air for cooling thereby, an inverter circuit connected to the lamp for supplying alternating current thereto when the circuit is connected to a direct current source, the circuit including electrical components within said enclosure and a transistor mounted on the front surface of the reflector behind the lamp and in intimate thermal contact with the reflector whereby the reflector constitutes heat dissipating means for the transistor and whereby the transistor itself is exposed to the ambient air for cooling thereby.

2. A portable lighting unit as claimed in claim 1, wherein said cover secured to the rear surface of the reflector is non-metallic and is thermally and electrically insulative but covers only part of said rear surface, the remainder of the rear surface extending beyond the cover and being uncovered and exposed to the ambient air for cooling thereby, one of the electrical components within said enclosure being a transformer.

(References on following page)

References Cited by the Examiner

UNITED STATES PATENTS

| | | | |
|---|---|---|---|
| 2,435,164 | 1/1948 | Sobel | 240—10.65 |
| 2,668,229 | 2/1954 | Akroyd | 240—10.6 |
| 2,849,598 | 8/1958 | Lipscomb | 240—51.11 X |
| 2,886,699 | 5/1959 | Harling | 240—47 X |
| 3,119,048 | 1/1964 | Tsuchiya | 315—200 |
| 3,152,764 | 10/1964 | Rice | 240—47 X |

FOREIGN PATENTS 1,063,421  12/1953  France.

NORTON ANSHER, *Primary Examiner.*
CHARLES R. RHODES, *Assistant Examiner.*